United States Patent
Caceres (10) Patent No.: US 9,910,875 B2
(45) Date of Patent: Mar. 6, 2018

(54) BEST-VALUE DETERMINATION RULES FOR AN ENTITY RESOLUTION SYSTEM

(75) Inventor: Barry M. Caceres, Las Vegas, NV (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 757 days.

(21) Appl. No.: 12/341,526

(22) Filed: Dec. 22, 2008

(65) Prior Publication Data

US 2010/0161634 A1    Jun. 24, 2010

(51) Int. Cl.
*G06F 17/00*     (2006.01)
*G06F 17/30*     (2006.01)

(52) U.S. Cl.
CPC ............... *G06F 17/30306* (2013.01)

(58) Field of Classification Search
CPC ......... G06F 17/30156; G06F 17/30489; G06F 3/0641; G06F 17/30306
USPC .................... 707/692, 90, 694, 701, 999.101
See application file for complete search history.

(56) References Cited

U.S. PATENT DOCUMENTS

| | | | |
|---|---|---|---|
| 5,303,149 A | 4/1994 | Janigian | |
| 5,333,317 A * | 7/1994 | Dann | |
| 5,956,707 A | 9/1999 | Chu | |
| 6,256,614 B1 * | 7/2001 | Wecker et al. | 705/14.19 |
| 6,907,609 B1 * | 6/2005 | Kukura et al. | 719/316 |
| 7,092,956 B2 * | 8/2006 | Ruediger | 707/602 |
| 7,152,060 B2 * | 12/2006 | Borthwick et al. | 707/770 |
| 7,200,600 B2 | 4/2007 | Gelfand | |
| 7,287,019 B2 | 10/2007 | Kapoor et al. | |
| 7,634,508 B2 * | 12/2009 | Bhatia et al. | |
| 7,725,331 B2 * | 5/2010 | Schurenberg et al. | 705/3 |
| 7,822,757 B2 * | 10/2010 | Stoker et al. | 707/758 |
| 7,865,507 B2 * | 1/2011 | Namait et al. | 707/732 |
| 8,412,712 B2 | 4/2013 | Caceres | |
| 2002/0184181 A1 | 12/2002 | Agarwal et al. | |
| 2003/0120652 A1 * | 6/2003 | Tifft | 707/6 |
| 2003/0154194 A1 * | 8/2003 | Jonas | 707/3 |

(Continued)

FOREIGN PATENT DOCUMENTS

| | | |
|---|---|---|
| TW | I273454 B | 2/2007 |
| TW | I273812 B | 2/2007 |

OTHER PUBLICATIONS

Ehud Reiter, et al. "A Fast Algorithm for the Generation of Referring Expressions," Department of Artificial Intelligence: University of Edinburgh, Aug. 23-28, 1992, pp. 232-238.

(Continued)

*Primary Examiner* — Mohammed R Uddin
(74) *Attorney, Agent, or Firm* — Patterson + Sheridan, LLP (57) ABSTRACT

Primary value determination rules may be used by entity resolution system to select a "best" or "primary" value of an attribute from a plurality of attribute values. For example, the "best" name, address, phone number, etc. to use in presenting a summary of information about that entity may be determined. Further, the primary value determination rules may each be configured to assign a confidence score to the "best" values selected for of a given entity. Doing so allows a selection of a "best" value for a given attribute made by one rule to be overridden by a selection of another "best" value made by another rule for that same attribute.

21 Claims, 6 Drawing Sheets

(56) References Cited

U.S. PATENT DOCUMENTS

| | | | |
|---|---|---|---|
| 2004/0098339 A1* | 5/2004 | Malek | G06Q 20/00 705/44 |
| 2004/0210763 A1 | 10/2004 | Jonas | |
| 2004/0249789 A1* | 12/2004 | Kapoor et al. | 707/2 |
| 2005/0038671 A1* | 2/2005 | Naeymi-Rad et al. | 705/2 |
| 2005/0097210 A1* | 5/2005 | Kane et al. | 709/225 |
| 2005/0120006 A1 | 6/2005 | Nye | |
| 2005/0216416 A1 | 9/2005 | Abrams et al. | |
| 2006/0004686 A1 | 1/2006 | Molnar et al. | |
| 2006/0004875 A1 | 1/2006 | Baron et al. | |
| 2006/0053129 A1 | 3/2006 | Motwani et al. | |
| 2006/0085457 A1 | 4/2006 | Gelfand | |
| 2006/0101095 A1 | 5/2006 | Episale et al. | |
| 2007/0005593 A1 | 1/2007 | Self et al. | |
| 2007/0192122 A1* | 8/2007 | Routson et al. | 705/1 |
| 2007/0198598 A1 | 8/2007 | Betz et al. | |
| 2007/0239756 A1 | 10/2007 | Li et al. | |
| 2007/0260492 A1 | 11/2007 | Feied et al. | |
| 2007/0276637 A1 | 11/2007 | Allen et al. | |
| 2007/0276858 A1* | 11/2007 | Cushman, II | G06F 17/30303 |
| 2007/0295797 A1* | 12/2007 | Herman et al. | 235/375 |
| 2008/0004864 A1 | 1/2008 | Gabrilovich et al. | |
| 2008/0046474 A1 | 2/2008 | Sismanis | |
| 2008/0243967 A1 | 10/2008 | Bhatia et al. | |
| 2008/0263175 A1* | 10/2008 | Naono et al. | 709/217 |
| 2008/0319983 A1* | 12/2008 | Meadows | 707/5 |
| 2009/0094237 A1* | 4/2009 | Churi et al. | 707/6 |
| 2009/0106242 A1* | 4/2009 | McGrew et al. | 707/6 |
| 2009/0271348 A1* | 10/2009 | Allen et al. | 706/47 |
| 2010/0161566 A1* | 6/2010 | Adair et al. | 707/690 |

OTHER PUBLICATIONS

Joel Brynielsson, et al. "A Toolbox for Multi-Attribute Decision-Making," Department of Numerical Analysis and Computer Science: Royal Institute of Technology, Dec. 2003, pp. 1-13.

O. Benjelloun, H. Garcia-Molina, D. Memestrina, Q. Steven, E. Whang and J. Widom, "Swoosh: A Generic Approach to Entity Resolution" The VIDB Journal Manuscript No. (20 pgs).

B. On, E. Elmacioglu, D. Lee, J. Kang, J. Pei, "Improving Grouped-Entity Resolutions using Quasi-Cliques".

D. Menestrain, O. Benjelloun, and H. Carcis-Molina, "Generic Entity Resolution with Data Confidences" Stanford University (8 pgs).

I. Bhattachyarya and L. Getoor, "A Latent Dirichlet Model for Unsupervised Entity Resolution" University of Maryland, Department of Computer Science, pp. 47-58.

Indrajit Bhattacharya et al., "Collective Entity Resolution in Relational Data," ACM Transactions on Knowledge Discovery from Data, Mar. 2007, vol. 1(1): pp. 1-36.

Angryk et al., "Attribute-oriented Fuzzy Generalization in Proximity- and Similarity-Based Relational Database Systems", International Journal of Intelligent Systems, v 22, n 7, Jul. 2007, 763-79.

Ananthakrishna et al., "Eliminating Fuzzy Duplicates in Data Warehouses", Proceedings of the Twenty-eighth International Conference on Very Large Data Bases, 2002, 586-97, ISBN-10: 1 55860 869 9.

Angryk et al., "Attribute-oriented Fuzzy Generalization in Proximity- and Similarity-Based Relational Database Systems", International Journal of Intelligent Systems, v 22, n 7, Jul. 2007, 763-779.

Bhattacharya et al, Collective Entity Resolution in Relational Data; Published Mar. 2007; pp. 1-36, ACM Digital Library (Abstract only) (available online) http://dl.acm.org/citation.cfm?id=1217304.

US Patent Application entitled "Detecting Entity Relevance Due to a Multiplicity of Distinct Values for an Attribute Type", U.S. Appl. No. 12/341,579, filed Dec. 22, 2008.

US Patent Application entitled "Grouping Similar Values for a Specific Attribute Type of an Entity to Determine Relevance and Best Values", U.S. Appl. No. 12/341,643, filed Dec. 22, 2008.

* cited by examiner

Value Rule Configuration — 302

| | | |
|---|---|---|
| Rule Name: | Determine the Primary Full Name | —304 |
| Processing Rank: | 50 | —306 |
| Attribute Type: | Full Name ▼ | —308 |
| Detection Method: | Most Common Value by Exact Match ▼ | —310 |
| Confidence Level: | 80 | —312 |

Only Apply to Entities Satisfying:

| Attribute Type | Matching Value | |
|---|---|---|
| Gender ▼ | Male ▼ | —316 |

Add Qualifying Criteria —314
—313

[ Save ] [ Revert ]

Value Rule Configuration — 318

| | | |
|---|---|---|
| Rule Name: | Determine the Names | —320 |
| Processing Rank: | 60 | |
| Attribute Type: | Names (Full Name, Given Name, Surname) ▼ | —324 |
| Detection Method: | Most Common Value by Exact Match ▼ | —326 |
| Confidence Level: | 70 | —328 |

Only Apply to Entities Satisfying:

| Attribute Type | Matching Value | |
|---|---|---|
| Gender ▼ | Female ▼ | —330 |

Add Qualifying Criteria —332

[ Save ] [ Revert ]

FIG. 3

*Primary Value Rule Configuration* — 402

| | |
|---:|:---|
| Rule Name: | Determine the Best Phone Number ⟵ 404 |
| Processing Rank: | 50 |
| Attribute Type: | Phone Number ▾ ⟵ 408 |
| Detection Method: | Most Common Value Within Previous Two Years ▾ ⟵ 410 |
| Confidence Level: | 40 ⟵ 412 |

Only Apply to Entities Satisfying:

Attribute Type      Matching Value

[______▾]      [______▾]

*Add Qualifying Criteria*

[ Save ] [ Revert ]

*Value Rule Configuration* — 418

| | |
|---:|:---|
| Rule Name: | Determine the Latest Phone Number ⟵ 419 |
| Processing Rank: | 10 |
| Attribute Type: | Phone Number ▾ ⟵ 422 |
| Detection Method: | Phone Number Provided in Most Recent Record ▾ ⟵ 326 |
| Confidence Level: | 100 ⟵ 426 |

Only Apply to Entities Satisfying:

Attribute Type      Matching Value

[______▾]      [______▾]

*Add Qualifying Criteria*

[ Save ] [ Revert ]

New Identity Record

| First Name | Last Name | Phone Number | Email | Zip Code | ... |
|---|---|---|---|---|---|
| Jack | Black | 111-222-3456 | joe@dinero.com | 22233 | ... |

604 606 608 610 612 — 602

Entity: Joe Dinero

| First Name | Last Name | Phone Number | Email | Zip Code | ... |
|---|---|---|---|---|---|
| Joe | Dinero | 111-222-3456 | joe@dinero.com | 22233 | ... |
| Joseph | Dinero | 111-222-3456 | joe@dinero.com | 22777 | ... |
| Joe | White | 333-444-5678 | joe@dinero.com | 33344 | ... |

618 620 622 624 626 — 616

Output - Primary Values for Entity

| Alert: Banned Guest May Have Checked In |
|---|
| Name: Joe Dinero (checked in as Jack Black) |
| Phone: 111-222-3456 |
| Email: joe@dinero.com |
| ⋮ |

638 — Name
640 — Phone
642 — Email

BEST-VALUE DETERMINATION RULES FOR AN ENTITY RESOLUTION SYSTEM

BACKGROUND OF THE INVENTION

Field of the Invention

Embodiments of the invention generally relate to processing identity records in an entity resolution system, and more particularly, to applying a set of best value determination rules to entities in an entity resolution system.

Description of the Related Art

In an entity resolution system, identity records are loaded and resolved against known identities to derive a network of entities and relationships between entities. An "entity" generally refers to an organizational unit used to store identity records that are resolved at a "zero-degree relationship." That is, each identity record associated with a given entity is believed to describe the same person, place, or thing (e.g.: the identity of an employee represented as an employee record from an employee database entity-resolved with the identity of a property owner from the county assessor's public records). Thus, one entity may reference multiple individual identities with potentially different values for various attributes. This is frequently benign, e.g., in a case where an entity includes two identities with different names, a first being an identity record identifying a woman based on a familial surname and a second identity record identifying the same woman based on a married surname. Of course, in other cases, differing attribute values between identities in the same entity may be an indication of mischief or a problem, e.g., in a case where one individual is impersonating another, using a fictitious identity, or engaging in some form of identity theft. The entity resolution system may link entities to one another by relationships. For example, a first entity may have a $1^{st}$ degree with a second entity based on identity records (in one entity, the other, or both) that indicate the individuals represented by these two entities are married to one another, reside at the same address, or share some other common information.

The process of resolving identity records and detecting relationships between entities may be performed using predetermined or configurable entity resolution rules. Typically, relationships between two entities are derived from information (e.g., a shared address, employer, telephone number, etc.) in identity records that indicate a relationship between the two entities. Two examples of such rules include the following:

- If the inbound identity record has a matching "Social Security Number" and close "Full Name" to an existing entity, then resolve the new identity to the existing entity.
- If the inbound identity record has a matching "Phone Number" to an existing entity, then create a relationship between the entity of the inbound identity record and the one with the matching phone number.

The first rule adds a new inbound record to an existing entity, where the second creates a relationship between two entities based on the inbound record. Of course, the entity resolution rules may be tailored based on the type of inbound identity records and to suit the needs of a particular case.

Entity resolution systems may also include rules for detecting relevant identities, entities, conditions, or events, i.e., rules for generating alerts based on incoming identity records. For example, a rule may check the attributes of an inbound identity record and generate an alert when a particular match is found (e.g., the inbound identity record is of interest because it includes an address within a particular zip-code). Or an alert rule may specify situations where an assigned role of an inbound identity record conflicts with an assigned role of another identity record with which the inbound record has a relationship at zero or more degrees (e.g., an entity with an assigned role of "Employee" has a strong relationship to an entity with an assigned role of "Vendor"). As another example, an alert rule may be defined as a combination of both methods (e.g., alert whenever an entity with the "Nevada Gaming Black List" role also has the "Hotel Guest" role and the hotel involved is located in the state of "Nevada"). Of course, the relevance rules used may be tailored to suit the needs of a particular case. The entity resolution system may include an alert analysis system configured to allow analysts to review and analyze alerts, entities, and identities, as well as provide comments or assign a disposition to alerts generated by the entity resolution system.

In entity resolution systems, a single entity may have multiple values for the same attribute type due to historical attributes accumulated over time or due to the nature of the attribute type. For example, an entity may have multiple addresses, phone numbers, driver's license numbers, names, etc. Multiple values may also exist due to the variety of systems from which identity records are drawn. Moreover, different record systems may introduce typos, transposition of characters, or system-specific alterations, such as the truncation of addresses.

SUMMARY OF THE INVENTION

One embodiment of the invention includes a computer-implemented method for selecting a primary value from a plurality of values in an entity resolution system storing identity records related to a plurality of entities. The method may generally include receiving a selection of an entity from the plurality of entities stored in the entity resolution system. Each entity may be associated with a plurality of identity records and each identity record may include one or more attribute types and attribute values. Also, each entity is presumed by the entity resolution system to represent a distinct individual. The method may also include evaluating the selected entity against one or more primary value determination rules. The evaluation for each respective primary value determination rule may generally include identifying one or more attribute types associated with the respective primary value determination rule, identifying a set of attribute values stored in the identity records of the selected entity that correspond to the one or more identified attribute types, and selecting, from the identified set of attribute values, a primary value to be representative of the one or more identified attribute types for the selected entity.

Another embodiment of the invention includes a computer program product for selecting a primary value from a plurality of values in an entity resolution system storing identity records related to a plurality of entities. The computer program product may include a computer usable medium having computer usable program code embodied therewith. The computer usable program code may generally be configured to receive a selection of an entity from the plurality of entities stored in the entity resolution system. Each entity is associated with a plurality of identity records, wherein each identity record includes one or more attribute types and attribute values, and wherein each entity is presumed to represent a distinct individual. The computer usable program code may be further configured to evaluate the selected entity against one or more primary value determination rules. The evaluation for each respective primary value determination rule may generally include identifying one or more attribute types associated with the respective primary value determination rule, identifying a set of attribute values stored in the identity records of the selected entity that correspond to the one or more identified attribute types, and selecting, from the identified set of attribute values, a primary value to be representative of the one or more identified attribute types for the selected entity.

Still another embodiment of the invention includes a processor and a memory containing a program, which, when executed by the processor is configured to select a primary value from a plurality of values in an entity resolution system storing identity records related to a plurality of entities by performing an operation. The operation may generally include receiving a selection of an entity from the plurality of entities stored in the entity resolution system. Each entity may be associated with a plurality of identity records and each identity record may include one or more attribute types and attribute values. Also, each entity is presumed by the entity resolution system to represent a distinct individual. The method may also include evaluating the selected entity against one or more primary value determination rules. The evaluation for each respective primary value determination rule may generally include identifying one or more attribute types associated with the respective primary value determination rule, identifying a set of attribute values stored in the identity records of the selected entity that correspond to the one or more identified attribute types, and selecting, from the identified set of attribute values, a primary value to be representative of the one or more identified attribute types for the selected entity.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide best value determination rules configured to select a value of an attribute from a plurality of attribute values in an entity resolution system. An entity resolution system may group identity records into entities using an entity resolution process. A common occurrence within such a system is to have a single entity with multiple values for the same attribute type. For example, an entity may have multiple names, addresses, phone numbers, social security numbers, driver's license numbers, passport numbers, etc. In some cases (e.g.: addresses and phone numbers) it is common for a single entity to have multiple values for an attribute type due to historical attributes accumulated over time or due to the nature of attribute type (e.g.: home phone number versus mobile phone number). Often multiple values are found due to the disparate systems from which the identity records are drawn and can be introduced due to typos, transposition of characters, or system aspects (such as limiting a street name to a short number of characters so the address appears to be different when the street name is truncated).

For example, assume that the records for a given individual in an entity resolution system include the following phone numbers:
702.555.1212
702-555-1212
(702) 555-1212
702.555.1212
702-555-1313
702-555-1313

In this example, six different phone numbers are listed representing two distinct phone numbers, with other differences based on how the phone numbers are formatted. Similarly, assume that the identity records list the name of the individual associated with these phone numbers as follows:
Robert James Smith
J. Smith
Bob Smith
Robert Smith,
Robert James
James Roberts Embodiments of the invention provide techniques for selecting a "best" value from input data. For example, using the input records listed above, an entity resolution system may present an entity summary for this individual using the name of "Robert Smith", as "Smith" is the most common last name and "Robert" is the most common first name. Similarly, the entity resolution system may display the phone number 702-555-1212, as this number occurs four times (albeit with some differences in form).

Depending on which rules are applied to an entity, different "best" values may be obtained. Using the phone numbers listed above, if a rule specified to select a phone number based on the number of "exact matches," then the number 702-555-1313 would be selected. Furthermore, the rules that are applied to an entity may depend upon one or more attributes of the entity. For example, some rules may be restricted to entities with a "gender" attribute value of "female."

In one embodiment, a best value determination rule may be named and given a description. A rank may be associated with each rule so that the rules can be ordered for processing. Furthermore, criteria may be applied to a rule in order to specify the type of entities or attributes that the rule is applied. A best value determination method is associated with each rule. Different parameters may be required depending on the particular method used to determine a best value for a given attribute. A quantitative measure of confidence may be associated with the best value determination rules to indicate a measure of reliability in an attribute value selected as the "best" value. Note, as used herein a "best" or "primary" value is used to refer to an attribute selected from multiple available choices as being the most representative of a given entity or individual (as represented in the entity resolution system using multiple identity records).

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable medium may be, for example but not limited to, an electronic, magnetic, optical, electromagnetic, infrared, or semiconductor system, apparatus, device, or propagation medium. More specific examples a computer-readable storage medium include a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Further, computer useable media may also include an electrical connection having one or more wires as well as include optical fibers, and transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable storage medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
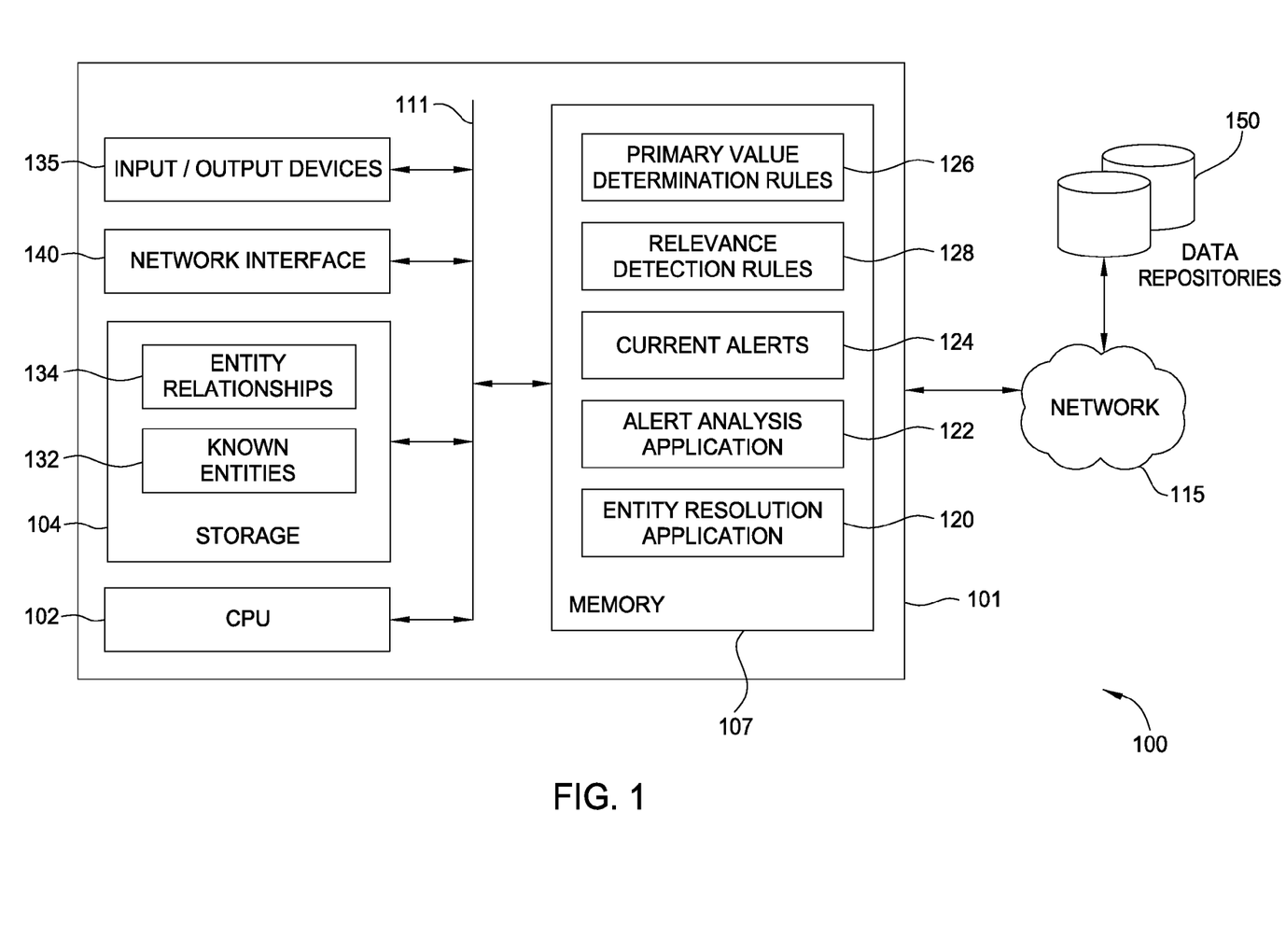
FIG. 1 is a block diagram illustrating a computing environment that includes an entity resolution application and best value determination rules, according to one embodiment of the invention.

FIG. 1 is a block diagram 100 illustrating a computing environment that includes an entity resolution application 120 and primary value determination rules 126, according to one embodiment of the invention. In this example, a computer system 101 is included to be representative of existing computer systems, e.g., desktop computers, server computers, laptop computers, tablet computers, and the like. However, the computer system 101 illustrated in FIG. 1 is merely an example of a computing system. Embodiments of the present invention may be implemented using other computing systems, regardless of whether the computer systems are complex multi-user computing systems, such as a cluster of individual computers connected by a high-speed network, single-user workstations, or network appliances lacking non-volatile storage. Further, the software applications described herein may be implemented using computer software applications executing on existing computer systems. However, the software applications described herein are not limited to any currently existing computing environment or programming language, and may be adapted to take advantage of new computing systems as they become available.

As shown, computer system 101 includes a central processing unit (CPU) 102, which obtains instructions and data via a bus 111 from memory 107 and storage 104. CPU 102 represents one or more programmable logic devices that perform all the instruction, logic, and mathematical processing in a computer. For example, CPU 102 may represent a single CPU, multiple CPUs, a single CPU having multiple processing cores, and the like. Storage 104 stores application programs and data for use by computer system 101. Storage 104 may be hard-disk drives, flash memory devices, optical media and the like. Computer system 101 may be connected to a data communications network 115 (e.g., a local area network, which itself may be connected to other networks such as the internet). As shown, storage 104 includes a collection of known entities 132 and entity relationships 134. In one embodiment, each known entity 132 stores one or more identity records that are resolved at a "zero-degree relationship." That is, each identity record in a given known entity 132 is believed to describe the same person, place, or thing represented by that known entity 132.

Additionally, computer system 101 includes input/output devices 135 such as a mouse, keyboard and monitor, as well as a network interface 140 used to connect computer system 101 to network 115.

Entity relationships 134 represent identified connections between two (or more) entities. In one embodiment, relationships between entities may be derived from identity records associated with a first and second entity, e.g., records for the first and second entity sharing and address or phone number. Relationships between entities may also be inferred based on identity records in the first and second entity, e.g., records indicating a role of "employee" for a first entity and a role of "vendor" for a second entity. Relationships may also be based on express statements of relationship, e.g., where an identity record associated with the first entity directly states a relationship to the second e.g., an identity record listing the name of a spouse, parent, child, or other family relation, as well as other relationships such as the name of a friend or work supervisor.

Memory 107 can be one or a combination of memory devices, including random access memory, nonvolatile or backup memory, (e.g., programmable or flash memories, read-only memories, etc.). As shown, memory 107 includes the entity resolution application 120 and the alert analysis application 122. Memory 107 also includes a set of primary value determination rules 126, a set of relevance detection rules 128, and a set of current alerts 124. The rules and alerts are discussed in greater detail below.

In one embodiment, the entity resolution application 120 provides a software application configured to resolve inbound identity records received from a set of data repositories 150 against the known entities 132. When an inbound record is determined to reference one (or more) of the known entities 132, the record is then associated with that entity 132. Additionally, the entity resolution application 120 may be configured to create relationships 134 (or strengthen or weaken existing relationships) between known entities 132, based on an inbound identity record. For example, the entity resolution application 120 may merge two entities where a new inbound entity record includes the same social security number as one of the known entities 132, but with a name and address of another known entity 132.

Further, the entity resolution application 120 (or the alert analysis application 122) may be configured to present a display of records associated with a given entity. For example, assume an alert is generated based a newly recited identity record (e.g., a hotel check-in record that resolves to an entity on a banned list). In one embodiment, the entity resolution application 120 (or the alert analysis application 122) may present an alert summary of the attributes of the entity that resulted in such an alert (i.e., the individual banned from a hotel now believed to be checked-in to that hotel). In such a case, the best value determination rules may be used to select the name of the individual to display. For example, assume that the individual has checked into the hotel using an assumed name, but listed a phone number known to be associated with the banned individual. In such a case the entity resolution system (120 or the alert analysis application 122) could display the name of the individual associated with the phone number over the name under which the individual checked in to the hotel.

Illustratively, computing environment 100 also includes the set of data repositories 150. In one embodiment, the data repositories 150 each provide a source of inbound identity records processed by the entity resolution application 120 and the alert analysis application 122. Examples of data repositories 150 include information from public sources (e.g., telephone directories and/or county assessor records, among others.) And also includes information from private sources, e.g., a list of employees and their roles within an organization, information provided by individuals directly such as forms filled out online or on paper, and records created concomitant with an individual engaging in some transaction (e.g., hotel check-in records or payment card use). Additionally, data repositories 150 may include information purchased from vendors selling data records. Of course, the actual data repositories 150 used by the entity resolution application 120 and the alert analysis application 122 may be tailored to suit the needs of a particular case, and may include any combination of the above data sources listed above, as well as other data sources. Further, information from data repositories 150 may be provided in a "push" manner where identity records are actively sent to the entity resolution application 120 and the alert analysis application 122 as well as in a "pull" manner where the entity resolution application 120 and the alert analysis application 122 actively retrieve and/or search for records from data repositories 150.

In one embodiment, the entity resolution application 120 may be configured to detect relevant identities, entities, conditions, or activities which should be the subject of further analysis. For example, once an inbound identity record is resolved against a given entity, relevance detection rules 128 may be evaluated to determine whether the entity, with the new identity record, satisfies conditions specified by any one of the relevance detection rules. That is, the entity resolution application 120 may determine whether the entity, with the new identity record, indicates that a relevant event has occurred. This could be manifested as a rule that checks the content of an inbound identity record and generates alerts if a particular match is found. All of the current alerts 124 may be stored in memory 107. In one embodiment, the entity resolution application 120 may be configured to apply a primary value determination rules 126 when an alert is generated to select which entity attribute values to include in the alert output. As described above, e.g., an entity may have multiple phone numbers associated with the "phone number" attribute, but the primary value determination rules 126 selects only one phone number to include n the alert. Thus, the alert displays only one phone number to the user.

Figure 2:
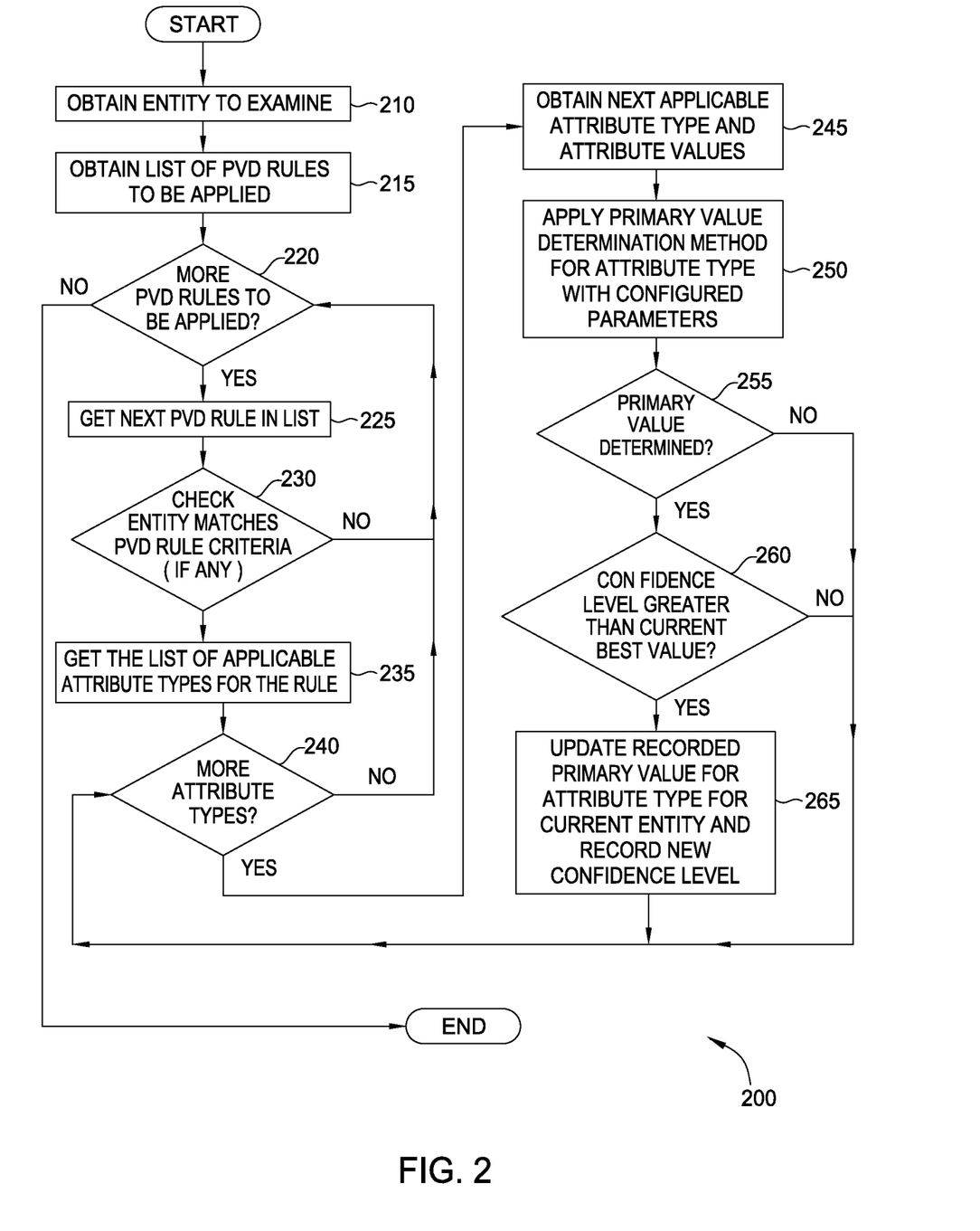
FIG. 2 is a flow diagram illustrating a method for applying best value determination rules in an entity resolution system, according to one embodiment of the invention.

FIG. 2 illustrates a method 200 for applying a set of primary value determination rules 126 to a collection of identity records in an entity resolution system, according to one embodiment of the invention. As shown, the method 200 begins at step 210 where an entity to examine is obtained. For example, assume a new identity record is entered into the entity resolution application 120 that includes an email address. In such a case, the email address may also match one associated with a known entity 132, and further, could result in an alert being generated. If so, when a user subsequently reviews the alert, the system may present a summary display of the records associated with this known entity. In one embodiment, the primary value determination rules are used to determine what attribute values (e.g., what name, phone number, email address) to display for this entity. At step 215, the entity resolution application 120 obtains a list of primary value determination (PVD) rules 126 to be applied to the records of the entity selected at step 210. A loop then occurs that includes steps 220-240, where one of the rules in the list is evaluated at each pass through the loop. At step 220, the application 120 may determine whether any additional rules remain to be applied. If so, at step 225, the application 120 may select the next rule to be applied. For example, in one embodiment, each PVD rule may be associated with a ranking, where rules with a higher ranking are applied prior to ones with a lower ranking. Alternatively, users may specify a sequence in which a given set of rules should be applied. At step 230, the application 120 may determine whether the entity matches any criteria specified for the PVD rule selected at step 225. For example, a given PVD rule might only apply to entities with a gender attribute of "female." In such a case, if the entity selected at step 210 has a gender attribute of "male," then the rule is skipped. Accordingly, if the entity does not match any PVD rule criteria, the method 200 returns to step 220 to evaluate additional PVD rules (if any).

At step 235, if the entity matches any PVD rule criteria, the application 120 may generate a list of attributes types associated with that PVD rule. That is, the application 120 may identify attributes of the entity for which the rule may be used to select a primary value (e.g., an entity name, phone number, or address, etc.). For example, a given PVD rule may apply only to the name of an individual. For each attribute type, a loop is performed that includes steps 245-265. During each pass through this loop, a primary value attribute is selected for one of the attribute types identified at step 235. At step 240, if there are no more attribute types in the list, then the method 200 returns to step 220. However, if additional attribute types remain, then at step 245, one of the attribute types is selected and the attribute values (e.g., a list of names) are retrieved from the identity records of the entity under consideration. At step 250, the application 120 applies the PVD rule (selected at step 230) to the attribute values (retrieved at step 245). At step 255, if a primary value is not selected by the PVD rule, then the method 200 returns to step 240, where another attribute type is selected from the list generated at step 235.

However, if a primary value is selected by the PVD rule, then at step 260, a confidence level associated with that primary value may be compared to a confidence level of the current primary value (if any). In one embodiment, the PVD rule may be used to assign "confidence level" to a primary value for an attributes as a measure of how well a given PVD rule believes that the primary value should be used as the "best" value for that attribute, e.g., how strongly a PVD rule believes a particular name or phone number should be used in a summary display of information related to that entity. Thus, if multiple rules are applied to evaluate the same attribute type, the primary value selected for a given attribute type by one rule may be outweighed by the primary value selected by another rule. If the confidence level of the new primary value is not greater than that of a current primary value, then the method 200 returns to step 240. However, if the confidence level of the new primary value is greater, then the current primary value may be updated with the new primary value at step 265. The confidence level may also be updated. The method 200 then returns to step 240. Once each attribute type has been evaluated, then the flow returns to step 220, where additional rules may be applied to the entity selected at step 210. Similarly, once each rule has been applied, the method 200 terminates, and a summary of the entity may be generated using the primary attribute values selected by applying the PVD rules.

Figure 3:
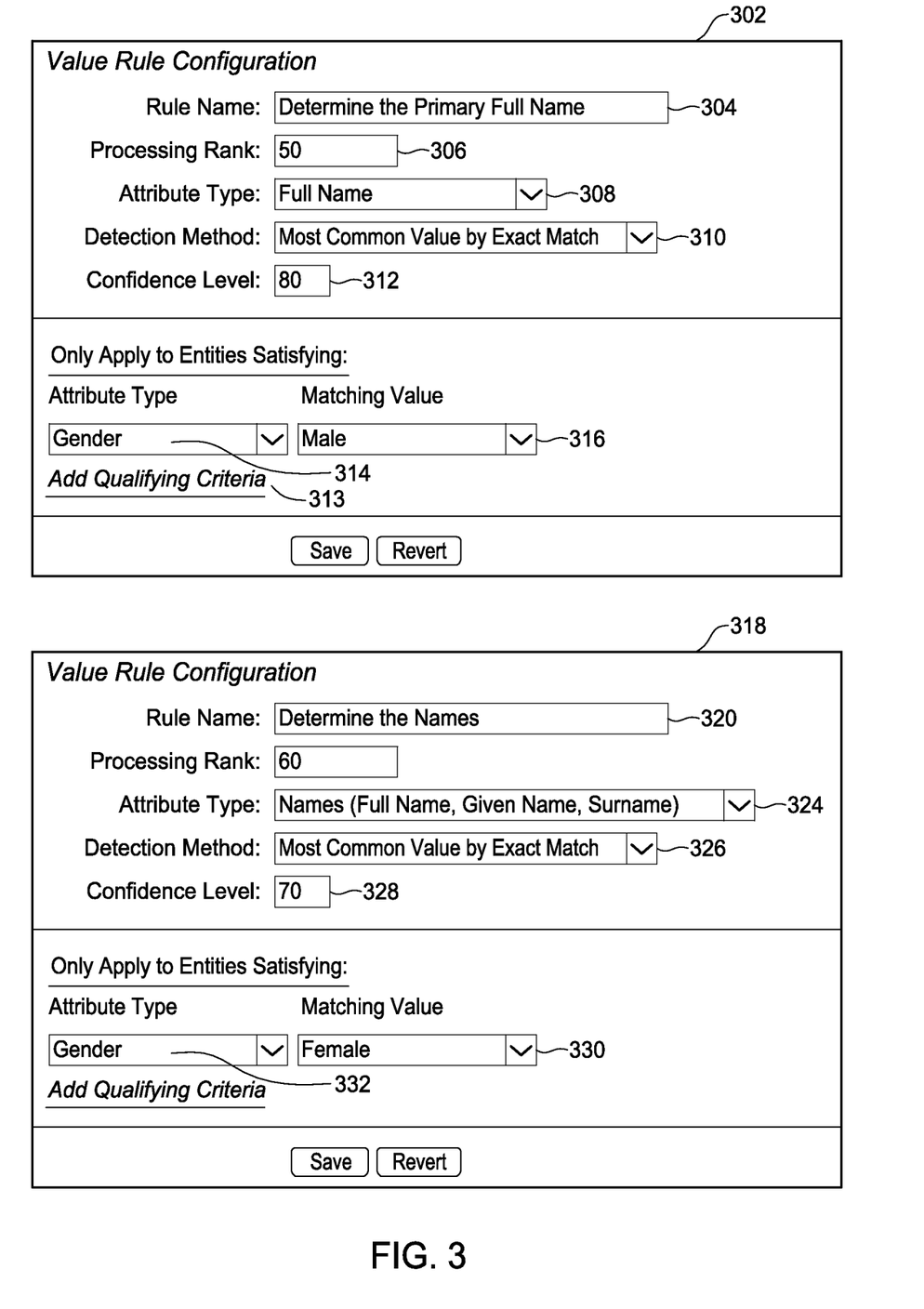
FIG. 3 illustrates an example of graphical user interface components used to configure a best value determination rule for a name attribute in an entity resolution system, according to one embodiment of the invention.

FIG. 3 illustrates an example of graphical user interface components 302 318 used to configure PVD rules for name attributes in an entity resolution system, according to one embodiment of the invention. As shown, component 302 displays the configuration for a PVD rule 304 named "Determine the Best Full Name." A processing rank field 306 may be used to specify an order in such rule is processed. That is, the ranking for a set of PVD rules may be used to determine a sequence which the PVD rules are applied to the identity records of a given entity. Illustratively, an "attribute type field 308" is set for "full name," which includes a first and last name. A detection method field 310 is set to "Most Common Value by Exact Match." Thus, this PVD rule selects the full name that appears most frequently in the identity records associated with this entity. A confidence level field 312 may be used to specify the reliability of a primary value selected using this PVD rule. In this example, the PVD rule 304 is only applied to entities that have a value of "male" 316, as specified using the "gender" attribute 314. Additional criteria may be added using a link 313 to specify what entities the PVD rule 304 should be applied.

Interface component 318 displays a configuration for a PVD rule 320 called "Determine the Names." Illustratively, an attribute type field 324 specifies that this rule should be applied to names, including full names, given names, and surnames. Like the PVD rule 304, a detection method field 326 of rule 320 is set to "Most Common Value by Exact Match." Unlike PVD rule 302, however, PVD rule 320 is only applied to entities that have a value of "female," as specified suing the for the "gender" attribute field 332. In this example, a confidence level 328 for PVD rule 320 is lower than the confidence level 312 of PVD rule 302. The lower value may be appropriate due to a greater likelihood of females changing names due to marriage.

Figure 4:
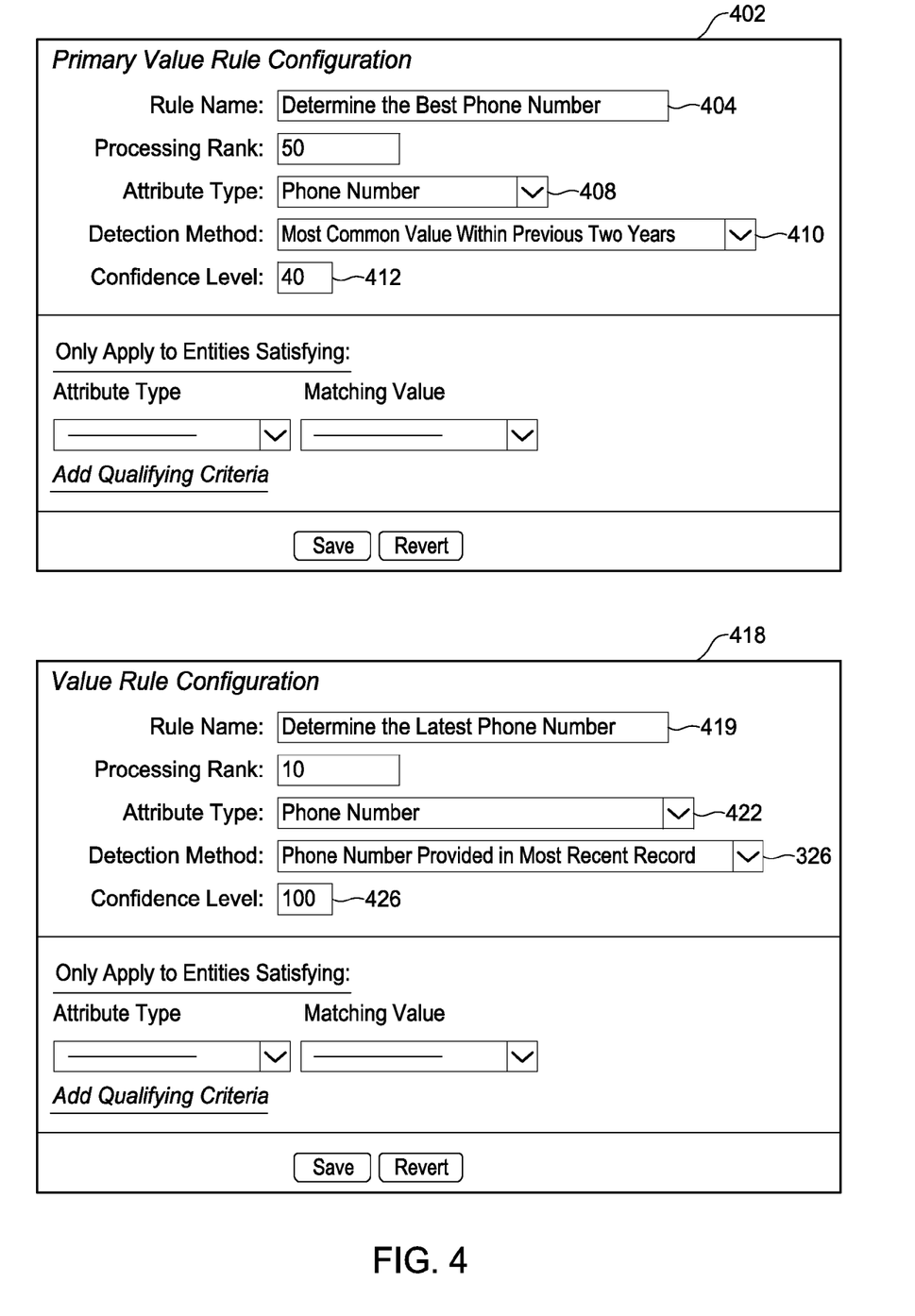
FIG. 4 illustrates an example of graphical user interface components used to configure a best value determination rule for a phone number attribute in an entity resolution system, according to one embodiment of the invention.

FIG. 4 illustrates an example of graphical user interface components 402 418 used to configure PVD rules for phone numbers in an entity resolution system, according to one embodiment of the invention. As shown, interface component 402 displays a set of configuration values for a PVD rule 404 named "Determine the Best Phone Number." Accordingly, the attribute type specified by an attribute type field 408 is set to "Phone Number." In this example, a detection method field 410 is set to "Most Common Value within Previous Two Years." Thus, the PVD rule 404 specifies that the "best" phone number for an entity should be selected as the number that appears most frequently in records associated with a given entity, but limited to records provided within the previous two years. A confidence level field 412 is somewhat low (40), as phone numbers may change much more frequently than names. Thus, if the detection method specified that PVD rule 402 should be applied using identity records received in the last six months, a much higher confidence level might be appropriate.

Similarly, interface component 418 displays the configuration for a PVD rule 419 named "Determine the Latest Phone Number." An attribute type field 422 is set to "Phone Number." A detection method field 410 is set to "Phone Number Provided in Most Recent Identity Record." Thus, PVD rule 419 specifies that the "best" phone number for an entity should be selected as the phone number that appeared most recently in the identity record associated with a given entity. The confidence level 426 is set to "100," which allows the value obtained from PVD rule 419 to override the value obtained from any other PVD rule (assuming a confidence level between 0 and 100).

Of course, one of ordinary skill in the art will recognizes that the example rule configuration interfaces shown in FIG. 3 (for configuring a PVD rule related to entity name) and FIG. 4 (for configuring a PVD rule related to an entity phone number) are merely examples for these attribute types and that other approaches may be used. And further, that a broad variety of PVD rules (and detection methods) may be used to select the best value for these and other attribute types associated with an entity in an entity resolution system.

As described above, the entity resolution application 120 may be configured to generate alerts from inbound identity records, and the PVD rules may be used to select what information (e.g., what name, phone number, address, etc.) is presented to a user when presenting an alert to a user. In one embodiment, an alert is generated when the conditions specified by one of the relevance-detection rules 128 are satisfied. Consider the following scenario where an example entity includes the following three identity records:

| Identity 1: | Identity 2: | Identity 3: |
| --- | --- | --- |
| Source: FBI Watch List | Source: HR Database | Source: PO Database |
| Role: Criminal | Role: Employee | Role: Vendor |
| Name: John Doe | Name: John H. Doe | Name: Johnny Doe |
| SSN: 111-11-1111 | SSN: 111-11-1111 | SSN: 111-11-1111 |

Note, in this example, each identity record includes a different variation of a similar name, but each name has the same social security number. Thus, the entity resolution application 120 may resolve these three records to a common entity representing all three identities. That is, the entity resolution system may conclude that these three records all refer to the same individual, despite having slightly different names. Now suppose the entity resolution application 120 includes the following two relevance detection rules used to manage potential conflicts-of-interest:
 "Employee knows/is Vendor"—detects cases where an employee knows or is a vendor.
 "Employee knows/is Criminal"—detects cases where an employee knows or is a criminal.

Based on these two rules and the three identity records, the entity resolution application 120 may generate the following two alerts for this entity:
 "Employee knows/is Vendor"
 "Employee knows/is Criminal"
The first alert is generated due to a role conflict caused by Identity 2 and Identity 3 being part of the same entity (zero-degree relationship). That is, a conflict exists because the "John H. Doe" identity from a human resource database indicates that individual is an employee, while at the same time the "Johnny Doe" identity from a purchase order database indicates that this individual is also a vendor. The second alert due to a role conflict caused by Identity 1 and Identity 2 being part of the same entity (zero-degree relationship).

Figure 5:
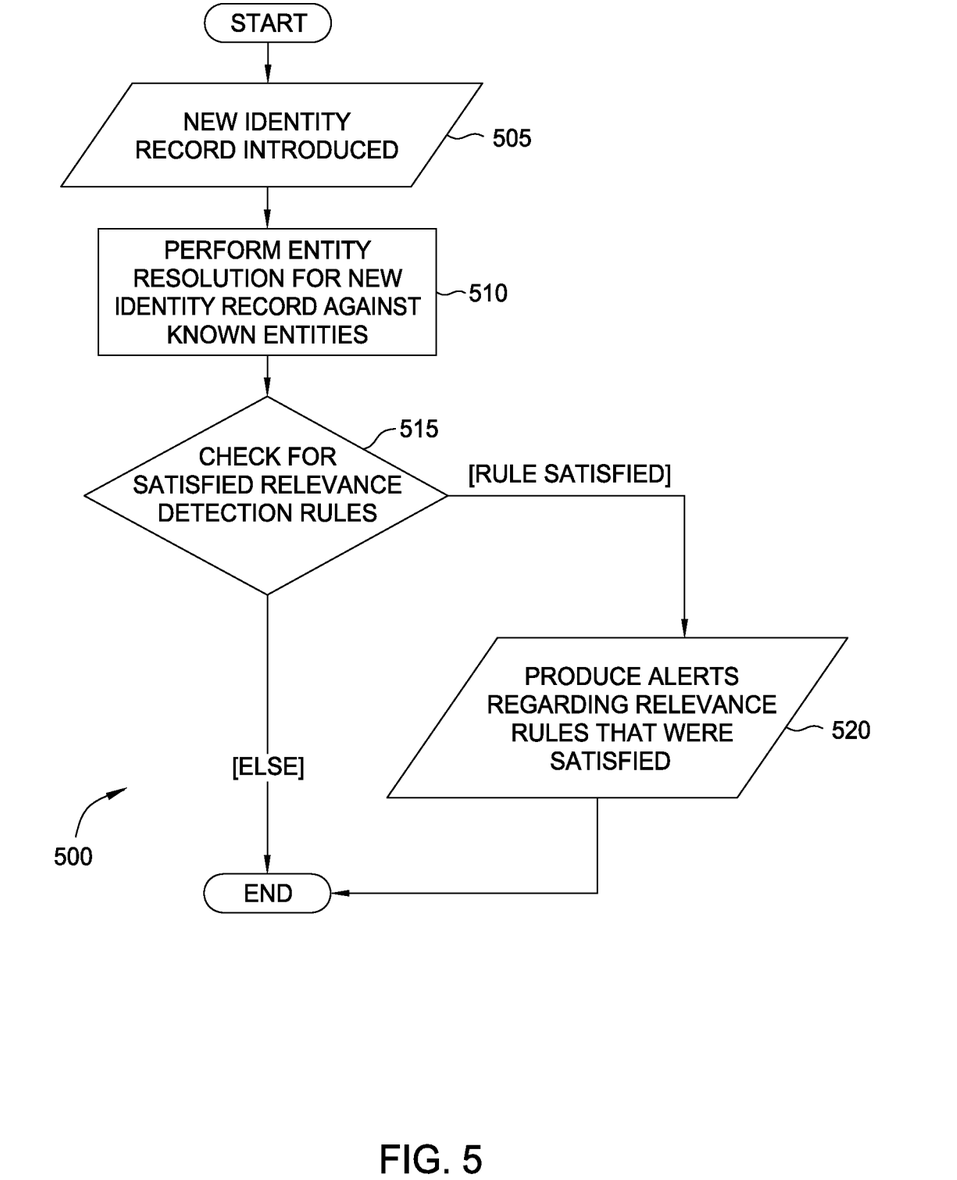
FIG. 5 is a flow diagram illustrating a method for producing alerts in an entity resolution system, according to one embodiment of the invention.

FIG. 5 is a flow diagram 500 illustrating a method for generating alerts in an entity resolution system, like the alerts for the "John H. Doe" entity, according to one embodiment of the invention. As shown, the method 500 begins at step 505 where the entity resolution application 120 receives a new inbound identity record. At step 510, the entity resolution application 120 resolves the new inbound record against the set of known entities 132. If the identity record does not relate to any known entity, then a new entity record may be created. Otherwise, the inbound identity record may be added to the records of one or more known entities 132. At step 515, the entity resolution application 120 may determine whether any relevance detection rules are satisfied based on the inbound identity records introduced at step 505 and processed at step 510. For example, when the inbound record is added to a first known entity, the entity resolution application 120 may evaluate the first known entity, as well as relationships between the first known entity and other entities, against the set of relevance detection rules. If any relevance detection rules are satisfied, then at step 520, the entity resolution application 120 may generate an alert for each relevance detection rule that has been satisfied.

Figure 6:
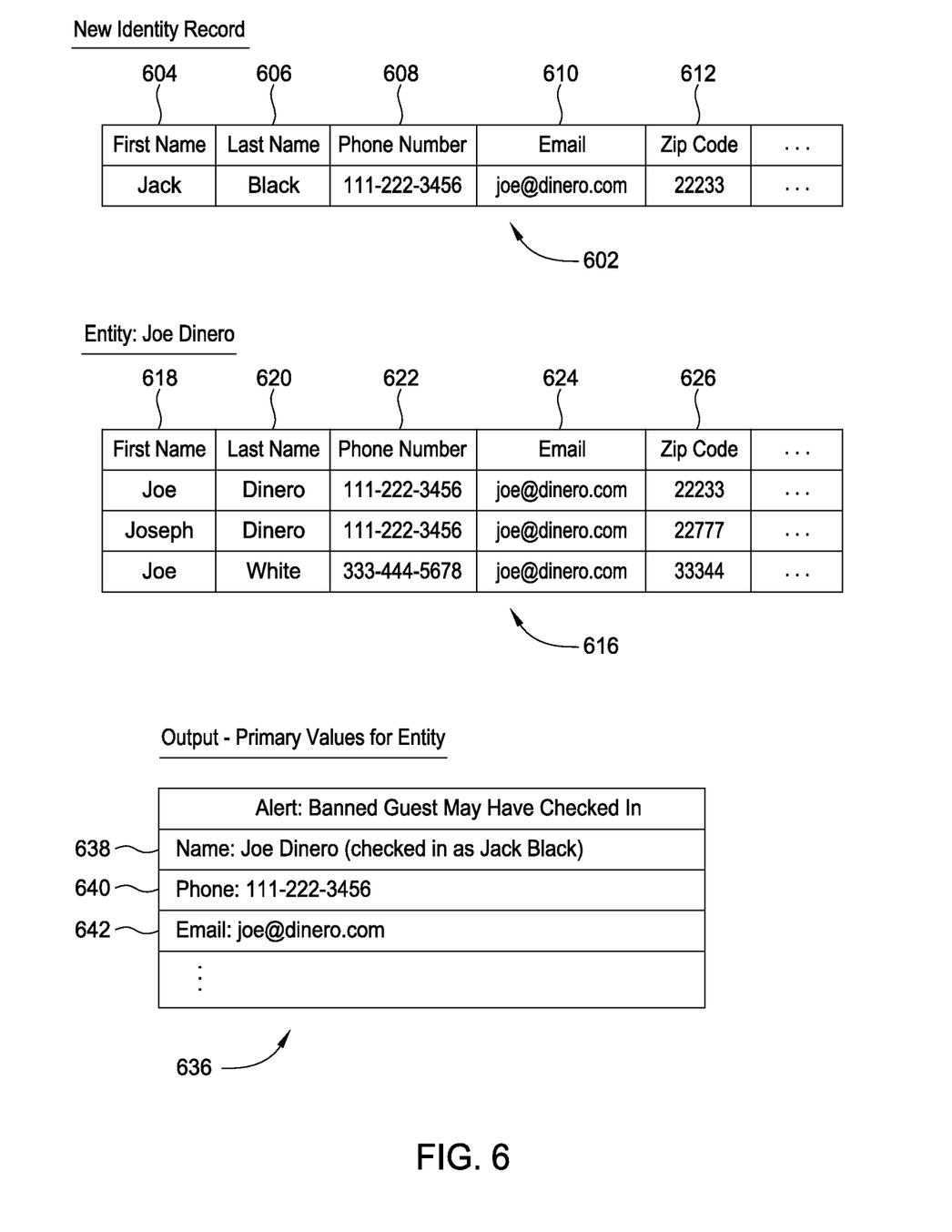
FIG. 6 illustrates an example of attribute values displayed in an alert generated by applying a best value determination rule to an entity, according to one embodiment of the invention.

FIG. 6 illustrates an example of attribute values that are displayed by an entity display summary in a generated alert 636 after the primary value determination rules 126 are applied to the identity records of the entity involved in the alert. In this example, a new identity record 602 is created when a hotel guest checks in. Illustratively, the identity record 602 includes values for attributes such as a first name 604, a last name 606, a phone number 608, an email address 610, a zip code 612, and so on. Note, the email address in the new identity record 602 specifies "joe@dinero.com." In one embodiment, the entity resolution application 120 may use information from the hotel check-in record (i.e., record 602) to determine whether an entity exists in the known entities 132 that matches with this individual. Assume the set of known entities 132 includes a set of records 616 for an entity named "Joe Dinero." Illustratively, each of the records 616 includes a first name 618, a last name 620, a phone number 622, an email address 624, a zip code 626, and so on.

In this example, the entity resolution system 120 may match the new identity record 602 with the entity "Joe Dinero," based on the matching the email addresses, a matching zip code for one of the records, and a partially matching phone number (same number; different area codes). That is, the entity resolution system may resolve the new identity record, having a name of "Jack Black" to an entity having a name of "Joe Dinero." Further, assume that the entity "Joe Dinero" refers to an individual banned from the hotel that the person named "Jack Black" is checking into. Accordingly, in response, the entity resolution system 120 may generate an alert that a prohibited individual may be in the hotel under an assumed name.

As described above, a set of PVD rules may be applied to the identity records 616 (including the new identify record 602, once it is resolved to the entity represented by identity records 616) to select what information is used to generate and display this alert. For example, the identity records 616 for "Joe Dinero" include two distinct first and last names, two distinct phone numbers, and three different zip codes, not including the new identify record 602 added to records 161 once it is resolved to the "Joe Dinero" entity. In presenting an alert to a user, a value for each of these fields needs to be selected. As shown, an alert 636 displays the primary values for the "Joe Dinero" entity determined after the PVD rules 126 are applied to the records 616 of the "Joe Dinero" entity. Assume the PVD rules select the first and last name to display using the most common names in the records 616. Accordingly, the alert 636 displays "Joe Dinero" instead of "Jack Black," even though the guest checked in under the alias "Jack Black." At the same time, as the assumed name of "Jack Black" will likely be relevant to the user investigating the alert 636, this name is also displayed. Assume that the PVD rule 419 of FIG. 4 named "Determine the Latest Phone Number" is applied to the records 616. Accordingly, the phone number provided by the identity record 602 is displayed in the alert 636. Note that even though the PVD rule 404 "Determine the Most Used Phone Number" selects "222-333-4567" as the "best" value, the PVD rule 419 overrides this selection because the PVD rule 419 has a confidence score of "100." Thus, the alert output includes "Joe Dinero" for the name 638 in the alert, a phone number of "111-222-3456," and an email address of "joe@dinero.com."

Advantageously, embodiments of the present invention provide primary value determination rules which may be used by entity resolution system to select a "best" value of an attribute from a plurality of attribute values. For example, the "best" name, address, phone number, etc. to use in presenting a summary of information about that entity may be selected. Further, the primary value determination rules may each be configured to assign a confidence score to the records of a given entity. Doing so allows a selection of a "best" value for a given attribute made by one rule to be overridden by a selection of another "best" value made by another rule for that same attribute.

While the foregoing is directed to embodiments of the present invention, other and further embodiments of the invention may be devised without departing from the basic scope thereof, and the scope thereof is determined by the claims that follow.

What is claimed is:

1. A computer-implemented method to reconcile distinct candidate values in an entity resolution system storing distinct identity records that resolve to a plurality of entities, the computer-implemented method comprising:

receiving a selection of an entity from the plurality of entities stored in the entity resolution system, wherein each entity is associated with a respective plurality of distinct identity records that previously resolved to the respective entity based on one or more entity resolution rules, wherein each identity record includes two or more attribute types and attribute values, wherein the attribute values in each identity record includes information corresponding to one individual, wherein a relationship is identified between at least two of the plurality of entities;

subsequent to resolving the plurality of distinct identity records to the selected entity based on the one or more entity resolution rules, evaluating the plurality of distinct identity records of the selected entity against a plurality of representative value determination rules distinct from the one or more entity resolution rules, wherein each representative value determination rule has a respective rule name and specifies to evaluate a respective attribute type using a distinct criterion for selecting a representative value, wherein the evaluation for each representative value determination rule comprises:

identifying two or more attribute types associated with the respective representative value determination rule, the representative value determination rule specifying to qualify a first attribute type by a specified value of a second attribute type different from the first attribute type, wherein at least two of the representative value determination rules are associated with at least the first attribute types;

identifying a set of attribute values, stored in the plurality of distinct identity records of the selected entity, that correspond to the first attribute type qualified by the specified value of the second attribute type;

determining whether the representative value determination rule applies to the entity, based on the identified set of attribute values;

upon determining that the representative value determination value rule applies to the entity, selecting, from the identified set of attribute values, a respective, distinct, candidate value to represent the first attribute types qualified by the specified value of the second attribute type, wherein each of the at least two representative value determination rules assigns a respective, distinct confidence level to the candidate value selected by the respective representative value determination rule;

determining, by operation of one or more computer processors, the candidate value having the highest confidence level among the selected candidate values;

designating only the candidate value as a sole value representing the first attribute type qualified by the specified value of the second attribute type, including storing an indication of the sole value as representing the first attribute type; and retaining each of the identified set of attribute values, represented by the sole value, as part of the plurality of distinct identity records of the selected entity without merging or replacing the identified set of attribute values in the plurality of distinct identity records in the selected entity; and generating an entity display summary including the sole value representing the first attribute type qualified by the specified value of the second attribute type, whereafter the entity display summary is output.

2. The computer-implemented method of claim 1, wherein two or more of the plurality of representative value determination rules are applied in a specified order determined from a ranking value assigned to two or more representative value determination rules.

3. The computer-implemented method of claim 1, further comprising:
   receiving a first identity record;
   resolving the first identity record to one of the plurality of entities;
   associating the first identity record; and
   upon determining that the identity record satisfies a relevance detection rule, generating an alert, wherein the alert includes the representative value selected for the first attribute type qualified by the specified value of the second attribute type.

4. The computer-implemented method of claim 1, wherein the relationship is selected from an express relationship and an implied relationship, wherein a respective, qualifying criterion is includable in each representative value determination rule, wherein each of the respective plurality of identity records for each of the plurality of entities is evaluated against the at least two representative value determination rules, wherein the computer-implemented method further comprises providing:
   (i) a first representative value determination rule that applies to the first attribute type of the respective identity record of the respective entity using a first confidence level; and
   (ii) a second representative value determination rule that applies, to the first attribute type of the respective identity record of the respective entity using a second confidence level.

5. The computer-implemented method of claim 4, wherein the respective plurality of identity records for each of the plurality of entities together constitute an available set of identity records, wherein the plurality of representative value determination rules includes:
   (iii) a third representative value determination rule that applies, to the second attribute type of only a first subset of the available set of identity records, a first qualifying criterion and using a third confidence level, wherein the first subset is selected based on the second attribute type having a first value specified by the first qualifying criterion.

6. The computer-implemented method of claim 5, wherein the plurality of representative value determination rules includes further:
   (iv) a fourth representative value determination rule that applies, to the second attribute type of only a second subset of the available set of identity records, a second qualifying criterion and using a fourth confidence level, wherein the first subset is selected based on the second attribute type having a second value specified by the second qualifying criterion;
   wherein the first and second values are distinct, wherein the first and second criteria are distinct, wherein the first, second, third, and fourth confidence levels are distinct, wherein the first and second subsets are mutually exclusive and are each less than all of the available set of identity records.

7. The computer-implemented method of claim 6, wherein each representative value determination rule specifies a respective plurality of distinct properties including:
   (i) the rule name;
   (ii) a processing rank;
   (iii) the attribute type;
   (iv) the criterion, which comprises a detection technique;
   (v) the confidence level; and
   (v) an indication of what, if any, qualifying criterion to apply to identity records.

8. The computer-implemented method of claim 7, wherein the first representative value determination rule specifies:
   (i) a rule name indicating to determine a most suitable phone number;
   (ii) a processing rank that is greater than that of the second representative value determination rule but that is less than that of the fourth representative value determination rule;
   (iii) an attribute type of phone number;
   (iv) a detection technique indicating to determine a most common value within a time period measured until two years prior;
   (v) a confidence level lowest among the first, second, third, and fourth representative value determination rules; and
   (vi) no qualifying criterion to apply.

9. The computer-implemented method of claim 8, wherein the second representative value determination rule specifies:
   (i) a rule name indicating to determine a latest phone number;
   (ii) a processing rank lowest among the first, second, third, and fourth representative value determination rules;
   (iii) an attribute type of phone number;
   (iv) a detection technique indicating to determine the phone number provided in a most recent identity record of the each entity;
   (v) a confidence level highest among the first, second, third, and fourth representative value determination rules; and
   (vi) no qualifying criterion to apply.

10. The computer-implemented method of claim 9, wherein the third representative value determination rule specifies:
    (i) a rule name indicating to determine a representative full name;
    (ii) a processing rank that is greater than that of the second representative value determination rule but that is less than that of the fourth representative value determination rule, wherein the processing rank is identical to that of the first representative value determination rule; and
    (iii) an attribute type of full name.

11. The computer-implemented method of claim 10, wherein the third representative value determination rule further specifies:
    (iv) a detection technique indicating to determine a most common value by exact match;
    (v) a confidence level second highest among the first, second, third, and fourth representative value determination rules; and
    (vi) the first qualifying criterion, which limits applicability of the third representative value determination rule only to identity records having a gender attribute type that matches a male gender value.

12. The computer-implemented method of claim 11, wherein the fourth representative value determination rule specifies:
    (i) a rule name indicating to determine one or more representative names;
    (ii) a processing rank highest among the first, second, third, and fourth representative value determination rules; and
    (iii) an attribute type of names including full names, given names, and surnames.

13. The computer-implemented method of claim 12, wherein the fourth representative value determination rule further specifies:
- (iv) a detection technique indicating to determine a most common value by exact match;
- (v) a confidence level second lowest among the first, second, third, and fourth representative value determination rules; and
- (vi) the second qualifying criterion, which limits applicability of the fourth representative value determination rule only to identity records having a gender attribute type that matches a female gender value.

14. The computer-implemented method of claim 13, wherein the first, second, third, and fourth representative value determination rules specify at least three distinct detection techniques, wherein each representative value determination rule is applied in a specified order relative to other representative value determination rules, wherein the specified order is determined based on the processing rank of the respective representative value determination rule.

15. The computer-implemented method of claim 14, wherein the relationship is, in respective instances, the express relationship and the implied relationship, wherein each representative value determination rule is applied by an entity resolution application executing on a computing system, wherein the computing system includes the one or more computer processors, wherein the computer-implemented method further comprises:
- receiving a first identity record;
- resolving the first identity record to one of the plurality of entities by the entity resolution application;
- associating the first identity record; and
- upon determining that the identity record satisfies a relevance detection rule distinct from each representative value determination rule, generating an alert by an alert analysis application executing on the computing system, wherein the alert analysis application is distinct from the entity resolution application, wherein the alert includes the candidate value selected for the first attribute type qualified by the specified value of the second attribute type, whereafter the alert is output.

16. A computer program product to reconcile distinct candidate values in an entity resolution system storing distinct identity records that resolve to a plurality of entities, the computer program product comprising:
- a non-transitory computer-readable medium having computer-usable program code embodied therewith, the computer-usable program code executable by one or more computer processors to:
  - receive a selection of an entity from the plurality of entities stored in the entity resolution system, wherein each entity is associated with a respective plurality of distinct identity records that previously resolved to the respective entity based on one or more entity resolution rules, wherein each identity record includes two or more attribute types and attribute values, wherein the attribute values in each identity record includes information corresponding to one individual, wherein a relationship is identified between at least two of the plurality of entities;
  - subsequent to resolving the plurality of distinct identity records to the selected entity based on the one or more entity resolution rules, evaluate the plurality of distinct identity records of the selected entity against a plurality of representative value determination rules distinct from the one or more entity resolution rules, wherein each representative value determination rule has a respective rule name and specifies to evaluate a respective attribute type using a distinct criterion for selecting a representative value, wherein the evaluation for each representative value determination rule comprises:
    - identifying two or more attribute types associated with the respective representative value determination rule, the representative value determination rule specifying to qualify a first attribute type by a specified value of a second attribute type different from the first attribute type, wherein at least two of the representative value determination rules are associated with at least the first attribute types;
    - identifying a set of attribute values, stored in the plurality of distinct identity records of the selected entity, that correspond to the first attribute types; qualified by the specified value of the second attribute type;
    - determining whether the representative value determination rule applies to the entity, based on the identified set of attribute values;
    - upon determining that the representative value determination value rule applies to the entity, selecting, from the identified set of attribute values, a respective, distinct, candidate value to represent the first attribute type qualified by the specified value of the second attribute type, wherein each of the at least two representative value determination rules assigns a respective, distinct confidence level to the candidate value selected by the respective representative value determination rule;
    - determining the candidate value having the highest confidence level among the selected candidate values;
    - designating only the candidate value as a sole value representing the first attribute types qualified by the specified value of the second attribute type, including storing an indication of the sole value as representing the first attribute type; and
    - retaining each of the identified set of attribute values, represented by the sole value, as part of the plurality of distinct identity records of the selected entity without merging or replacing the identified set of attribute values in the plurality of distinct identity records in the selected entity; and generate an entity display summary including the sole value representing the first attribute types qualified by the specified value of the second attribute type, whereafter the entity display summary is output.

17. The computer program product of claim 16, wherein two or more of the plurality of representative value determination rules are applied in a specified order determined from a ranking value assigned to two or more representative value determination rules.

18. The computer program product of claim 16, wherein the computer-useable program code is further executable to:
- receive a first identity record;
- resolve the first identity record to one of the plurality of entities;
- associate the first identity record; and
- upon determining that the identity record satisfies a relevance detection rule, generate an alert, wherein the alert includes the candidate value selected for the first attribute type qualified by the specified value of the second attribute type.

19. A system to reconcile distinct candidate values in an entity resolution system storing distinct identity records that resolve to a plurality of entities, the system comprising:
one or more computer processors; and
a memory containing a program which, when executed by the one or more computer processors, is configured to perform an operation comprising:
receiving a selection of an entity from the plurality of entities stored in the entity resolution system, wherein each entity is associated with a respective plurality of distinct identity records that previously resolved to the respective entity based on one or more entity resolution rules, wherein each identity record includes two or more attribute types and attribute values, wherein the attribute values in each identity record includes information corresponding to one individual, wherein a relationship is identified between at least two of the plurality of entities;
subsequent to resolving the plurality of distinct identity records to the selected entity based on the one or more entity resolution rules, evaluating the plurality of distinct identity records of the selected entity against a plurality of representative value determination rules distinct from the one or more entity resolution rules, wherein each representative value determination rule has a respective rule name and specifies to evaluate a respective attribute type using a distinct criterion for selecting a representative value, wherein the evaluation for each representative value determination rule comprises:
identifying two or more attribute types associated with the representative value determination rule, the representative value determination rule specifying to qualify a first attribute type by a specified value of a second attribute type different from the first attribute type, wherein at least two of the representative value determination rules are associated with at least the first attribute types;
identifying a set of attribute values, stored in the plurality of distinct identity records of the selected entity, that correspond to the first attribute type qualified by the specified value of the second attribute type;
determining whether the representative value determination rule applies to the entity, based on the identified set of attribute values;
upon determining that the representative value determination value rule applies to the entity, selecting, from the identified set of attribute values, a respective, distinct, candidate representative value to represent the first attribute type qualified by the specified value of the second attribute type, wherein each of the at least two representative value determination rules assigns a respective, distinct confidence level to the candidate value selected by the respective representative value determination rule;
determining the candidate value having the highest confidence level among the selected candidate values;
designating only the candidate value as a sole value representing the first attribute types qualified by the specified value of the second attribute type, including storing an indication of the sole value as representing the first attribute types; and
retaining each of the identified set of attribute values, represented by the sole value, as part of the plurality of distinct identity records of the selected entity without merging or replacing the identified set of attribute values in the plurality of distinct identity records in the selected entity; and
generating an entity display summary including the sole value representing the first attribute type qualified by the specified value of the second attribute type, whereafter the entity display summary is output.

20. The system of claim 19, wherein two or more of the plurality of representative value determination rules are applied in a specified order determined from a ranking value assigned to two or more representative value determination rules.

21. The system of claim 19, wherein the operation further comprises:
receiving a first identity record;
resolving the first identity record to one of the plurality of entities;
associating the first identity record; and
upon determining that the identity record satisfies a relevance detection rule, generating an alert, wherein the alert includes the candidate value selected for the first attribute type qualified by the specified value of the second attribute type.

* * * * *